D. B. ROGERS.
Grain Shovel.
No. 23,949
Patented May 10, 1859.
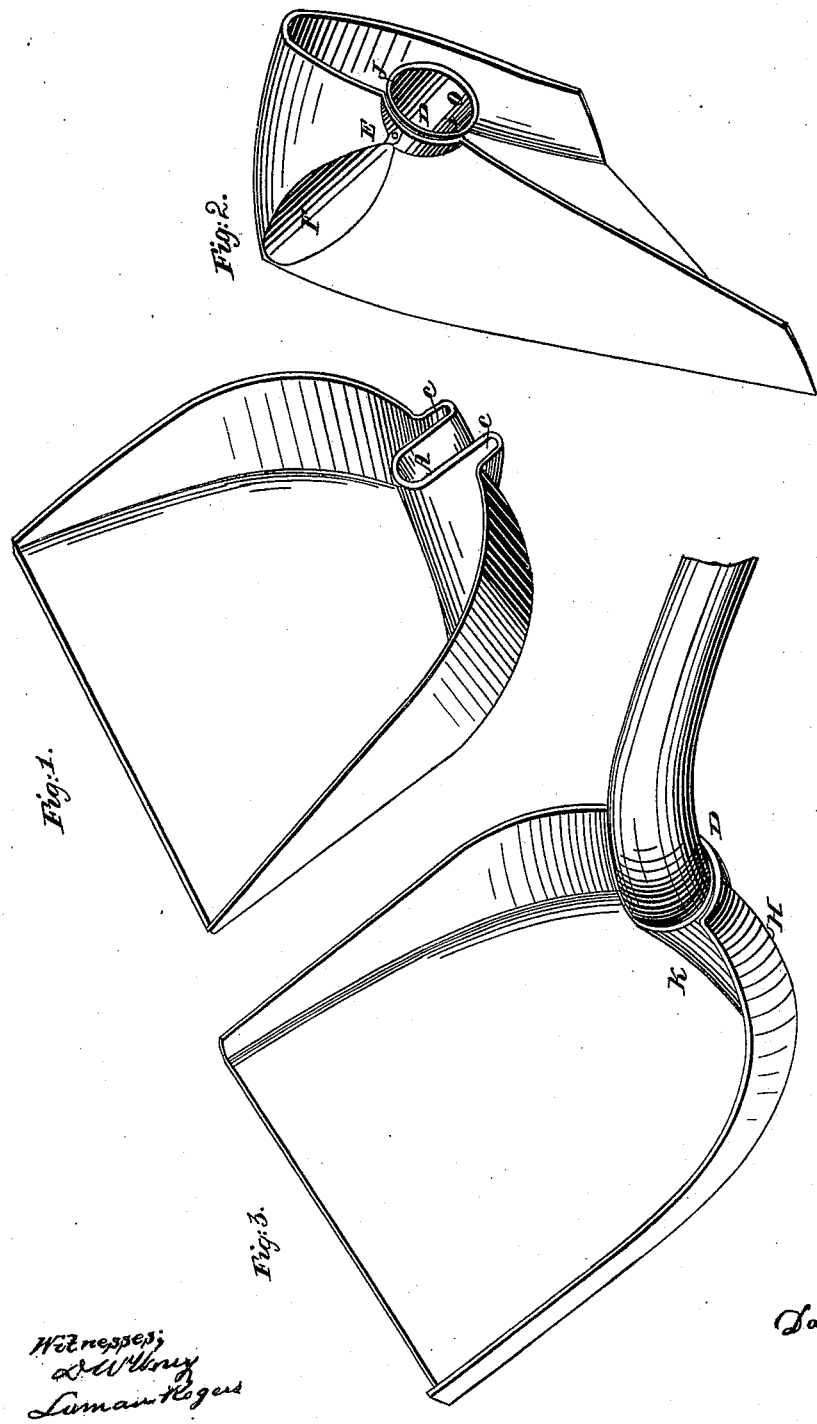
Witnesses:
Inventor;
David B. Rogers

UNITED STATES PATENT OFFICE.

DAVID B. ROGERS, OF PITTSBURG, PENNSYLVANIA.

IMPROVEMENT IN GRAIN-SHOVELS.

Specification forming part of Letters Patent No. 23,949, dated May 10, 1859.

*To all whom it may concern:*

Be it known that I, DAVID B. ROGERS, of Pittsburg, in the county of Allegheny and State of Pennsylvania, have invented a new and Improved Mode of Constructing Shovels; and I do hereby declare that the following is a full and exact description thereof, reference being had to the accompanying drawings, and to the letters of reference marked thereon.

The nature of my invention consists in forming the body and socket for the handle of shovels by bending the same out of a plate of iron of suitable size for that purpose.

To enable others skilled in the art to make and use my invention, I will describe the process of making.

Figure 1 is a perspective rear view of a shovel as it is formed with dies before and preparatory to shaping the socket. Fig. 2 is also a rear view of a shovel with the upper side down, with socket complete. Fig. 3 is a perspective view of a shovel with a section of a handle inserted in the socket thereof.

In making my invention I take a piece of iron suitable for grain-shovels. I then cut it into the ordinary shape for shovels of that kind, with this exception: I do not cut out any of the iron to give it a chance to bend into scoop-form and make room for the handle, as is now done in making this kind of shovel; but I so bend that part of the iron, with dies made for the purpose, that when so bent it resembles the W, as is represented in Fig. 1 at the letters A and C C, the center part being bent forward, and the outer parts are bent backward ready to be made into socket shape, to accomplish which I place a mandrel or round pin of sufficient size for the socket into the cavity A, and by rounding it the cavities C C are closed up against the body of the shovel, as represented in Fig. 2 at the letters *i* and J. The projecting iron at C C, Fig. 2, I then hammer close together and bend the same around the round pin, lapping one side over the other, as in case of any other socket, as is clearly shown in Fig. 2 at D D. The same lapping over each other extend downward the space of half to three-fourths of an inch, according to the depth of the bowl of the shovel, at which point the cavity opens gradually as it approximates downward, until about half-way, and then narrows a little and rounds off near the bottom, as seen at E and F, Fig. 2.

Fig. 3 represents the manner of fastening in the handle, where it is seen to pass through the socket in the back part of the lower end of the handle, being bare, and is riveted to the front side of the socket, as seen at K, with the head of the rivet on the bare wood, as seen at H. This way of making grain-shovels is an improvement of some value: first, because it is cheaper, having no straps to rivet on the handle, or, if any, nothing but narrow ones, which will not cut to waste; second, it is stiffer about the bowl, besides being free from rivets on the bottom to catch the floor, &c., in using.

What I claim as my invention is not the construction of a shovel in which the body of the shovel and a socket for the handle are made of one piece, for such have been cast and are now in use; but

What I do claim is—

The so bending of a plate of iron into the shape of a shovel as to form a socket for the handle out of the same piece of iron, substantially as described.

DAVID B. ROGERS.

Witnesses:
  C. W. LEWIS,
  ROBERT ROBBS.